UNITED STATES PATENT OFFICE 2,118,487

PROCESS FOR PREPARING POLYVINYL NITRATE

Lawton A. Burrows, Wenonah, and William F. Filbert, Woodbury, N. J., assignors to E. I. du Pont de Nemours & Company, Wilmington, Del., a corporation of Delaware No Drawing. Application July 15, 1936, Serial No. 90,724

8 Claims. (Cl. 260—144)

The present invention relates to a new and improved process for the nitration of polyvinyl alcohol and more particularly, to an improved process which produces a product having a higher nitrogen content.

It is known that polyvinyl alcohol may be nitrated with the usual mixed nitration acids. Thus, according to DRP 537,303, the nitration may be effected by dissolving polyvinyl alcohol in sulfuric acid, and adding the solution to a mixture of nitric and sulfuric acids. The patent states that polyvinyl alcohol is not nitrated by pure nitric acid but is oxidized thereby. It is generally known in the art that when polyvinyl alcohol is added in the usual manner to concentrated nitric acid, the alcohol ignites and burns with a free flame, leaving a carbonaceous residue.

Because of the low solubility of polyvinyl alcohol in concentrated sulfuric acid, undesirably large amounts of the acid are required in the esterification reaction. The slow rate of nitration of the alcohol in the presence of sulfuric acid is an additional disadvantage. Furthermore, only a comparatively low percentage of nitrogen is present in the product obtained with the use of such mixed acids. Thus, according to the German process, the average product prepared with mixed acids analyzed 10% nitrogen as against the maximum theoretical value of 15.73%, and the highest yield obtained was 80% of the theoretical amount.

The object of the present invention is a new and improved process for the nitration of polyvinyl alcohol. A further object is a process for the nitration of polyvinyl alcohol which produces a product of higher nitrogen content. An additional object is a rapid, economical, and efficient process for the production of polyvinyl nitrate, in high yields. Other objects will be apparent from the detailed description of the invention which follows.

We have found that these objects are accomplished by nitrating polyvinyl alcohol with nitric acid alone, without the use of mixed acids. Although such a result has been considered impossible in the prior art due to the rapid oxidation which ordinarily occurs when polyvinyl alcohol is added to nitric acid, we have discovered that such oxidation can be substantially prevented and a desirable product obtained by carrying out the reaction in such a manner that polyvinyl alcohol does not remain in contact with the air phase during treatment with the nitric acid. One method of accomplishing this consists in blanketing the nitric acid with an atmosphere of a gas inert toward the material, for example carbon dioxide or nitrogen. A second method consists in immersing the polyvinyl alcohol beneath the surface of the nitric acid in such a manner that the nitric acid-wetted alcohol is only momentarily in contact with the gaseous phase above the reaction mixture. In order to accomplish this more readily, instead of attempting to nitrate the polyvinyl alcohol in the finely powdered form in which it is normally available we have discovered that it is desirable to grain the material. After graining, the desired amount of the alcohol is more readily immersed beneath the surface of concentrated nitric acid in such manner that no particle of the alcohol remains exposed to the air for any appreciable period after it comes into contact with the acid. It is desirable that the whole surface of each particle of the alcohol be wet with acid at once.

The foregoing procedure avoids the rapid oxidation which occurs when ungrained alcohol is treated with nitric acid in the usual manner, wherein the majority of the finely divided material floats on the top of the acid for an interval sufficient to initiate combustion, and, when it does become submerged, at once reacts so rapidly with the acid that oxidation continues. By the process of our invention products having as high as 15% nitrogen content have been prepared without excessive losses due to oxidation. Details sufficient to enable any one skilled in the art to practice the invention are given in the examples which follow.

Example 1

Eighty-five grams of polyvinyl alcohol was mixed with an amount of water sufficient to render it slightly moist and cohesive. It was then grained through a 30-mesh screen, dried over night at room temperature, and finally at 105° C. This grained material was added rapidly to 750 cc. of well stirred 98.7% nitric acid in such manner as to be immediately immersed therein. This was done in order that the whole surface of each particle of alcohol would be wetted at once with acid. The alcohol was added at such a rate and with sufficient cooling that the temperature remained at 15 to 20° C. This required 35 minutes. The polyvinyl alcohol dissolved readily to form a syrupy orange-red colored solution, which was continually stirred for 1½ hours, the temperature being held at about 10° C. During this period, the viscosity of the solution diminished appreciably. The solution was then poured into cold water, where the product precipitated as a fine cream-colored powder. It was filtered and washed until the filtrate was no longer acid. The product was then dried and found to contain 13.8% nitrogen; it weighed 138 grams, showing a yield of 80.3% of the theoretical.

*Example 2*

Ten grams of polyvinyl alcohol was treated according to the process of Example 1, with the difference that 90% nitric acid was used. A 70.8% yield resulted, the material having a nitrogen content of 11.5%.

It is understood that the foregoing examples are merely by way of illustration and that we do not intend to be limited to the amounts, or other details stated therein.

Numerous advantages are obtained by means of the process of our invention. Only the single reagent, nitric acid, is necessary. Much less acid is required than is necessary with the use of mixed acids. Because of the ease of solution of polyvinyl alcohol in nitric acid, as compared with its slow and low degree of solubility in sulfuric acid, the reaction is accomplished much more rapidly than with the use of the mixed acids. In addition, a product of higher nitrogen content is obtained by our process without lowering of the yield. Since this highly nitrated polyvinyl alcohol has never been prepared before the discovery of the principles of our invention, and cannot be prepared by any other process, it is essentially a new composition of matter. Finally, the dangers and disadvantages of total or partial oxidation of the alcohol, associated with previous attempts to use nitric acid alone, have been completely overcome, and an entirely safe process has been developed.

In carrying out our invention, it is understood that strong nitric acid will desirably be used in the nitric esterification reaction, and by strong nitric acid we intend to designate acid in excess of 70% $HNO_3$. In the first example cited, acid of 98.7% strength was used and acid of high concentration is desirable because of the greater solubility in such acid. Preferably acid of greater than 90% strength will be used.

As many apparently widely different embodiments of the present invention may be made without departing from the spirit thereof, it is to be understood that we do not limit ourselves to the foregoing embodiments or description except as indicated in the following claims.

We claim:

1. The process for the preparation of polyvinyl nitrate, which comprises treating polyvinyl alcohol with strong nitric acid, under conditions unfavorable to oxidation.

2. The process for the preparation of polyvinyl nitrate, which comprises treating grained polyvinyl alcohol with nitric acid, under conditions unfavorable to oxidation.

3. The process for the preparation of polyvinyl nitrate, which comprises rapidly immersing polyvinyl alcohol in nitric acid.

4. The process for the preparation of polyvinyl nitrate, which comprises rapidly immersing polyvinyl alcohol in nitric acid, precipitating the product in water, washing, and drying.

5. The process of nitrating polyvinyl alcohol, which comprises rapidly and completely immersing said alcohol in nitric acid.

6. The process of nitrating polyvinyl alcohol, which comprises graining said alcohol, and rapidly immersing the particles of said grained alcohol in strong nitric acid.

7. The process of nitrating polyvinyl alcohol, which comprises treating said alcohol with nitric acid, the particles of said alcohol being maintained out of contact with the air phase throughout the period of said treatment.

8. The process of claim 7, in which the nitration is carried out in the presence of a nonoxidizing atmosphere, substantially inert toward the unnitrated material.

LAWTON A. BURROWS.
WILLIAM F. FILBERT.